US008397212B2

(12) United States Patent  (10) Patent No.: US 8,397,212 B2
Chijiiwa                      (45) Date of Patent:     Mar. 12, 2013

(54) MODULE HOSTING AND CONTENT GENERATION PLATFORM

(75) Inventor: Ryo Chijiiwa, Cerritos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1457 days.

(21) Appl. No.: 11/846,843

(22) Filed: Aug. 29, 2007

(65) Prior Publication Data

US 2009/0063619 A1    Mar. 5, 2009

(51) Int. Cl.
*G06F 9/44*   (2006.01)
*G06F 17/30*  (2006.01)

(52) U.S. Cl. .................. 717/106; 707/602
(58) Field of Classification Search ........... 717/106
See application file for complete search history.

(56) References Cited

U.S. PATENT DOCUMENTS

| 5,983,227 | A * | 11/1999 | Nazem et al. ........ 1/1 |
| 6,601,233 | B1  | 7/2003  | Underwood |
| 6,697,825 | B1  | 2/2004  | Underwood |
| 6,898,783 | B1 * | 5/2005 | Gupta et al. ........ 717/105 |
| 7,058,671 | B2 * | 6/2006 | Calvo et al. ........ 715/205 |
| 7,131,063 | B2 * | 10/2006 | Mateos ............ 715/205 |
| 7,152,207 | B1 * | 12/2006 | Underwood et al. .... 715/207 |
| 8,015,541 | B1 * | 9/2011 | Srinivasan et al. ...... 717/104 |
| 2004/0139169 | A1 * | 7/2004 | O'Brien et al. ........ 709/217 |
| 2006/0200751 | A1 | 9/2006 | Underwood |
| 2007/0118796 | A1 | 5/2007 | Nazem et al. |

OTHER PUBLICATIONS

Stevend, "Beating the Browser's iFrame Security", ELC Technologies, Nov. 2, 2006.
PCT/US2008/072969, Notification of Transmittal of the International Search Report and the Written Opinion of the International Searching Authority, or the Declaration, Korean IPO, Feb. 25, 2009.

* cited by examiner

*Primary Examiner* — James D Rutten
(74) *Attorney, Agent, or Firm* — James J. DeCarlo; Greenberg Traurig, LLP

(57) ABSTRACT

A module hosting and content generation platform in a social network site. In particular embodiments, a method includes receiving, from a network application, one or more module requests for module output data, wherein each module request includes a module identifier, an instance identifier, and user identifier, a module identifier; retrieving configuration information from the user configuration data store based on each of the one or more module requests; retrieving a module view definition from the module data store; generating the module output data by merging user configuration data with the retrieved module view definition; and performing additional processing operations based on the view type associated with the module; and transmitting the module output data to the network application.

21 Claims, 6 Drawing Sheets

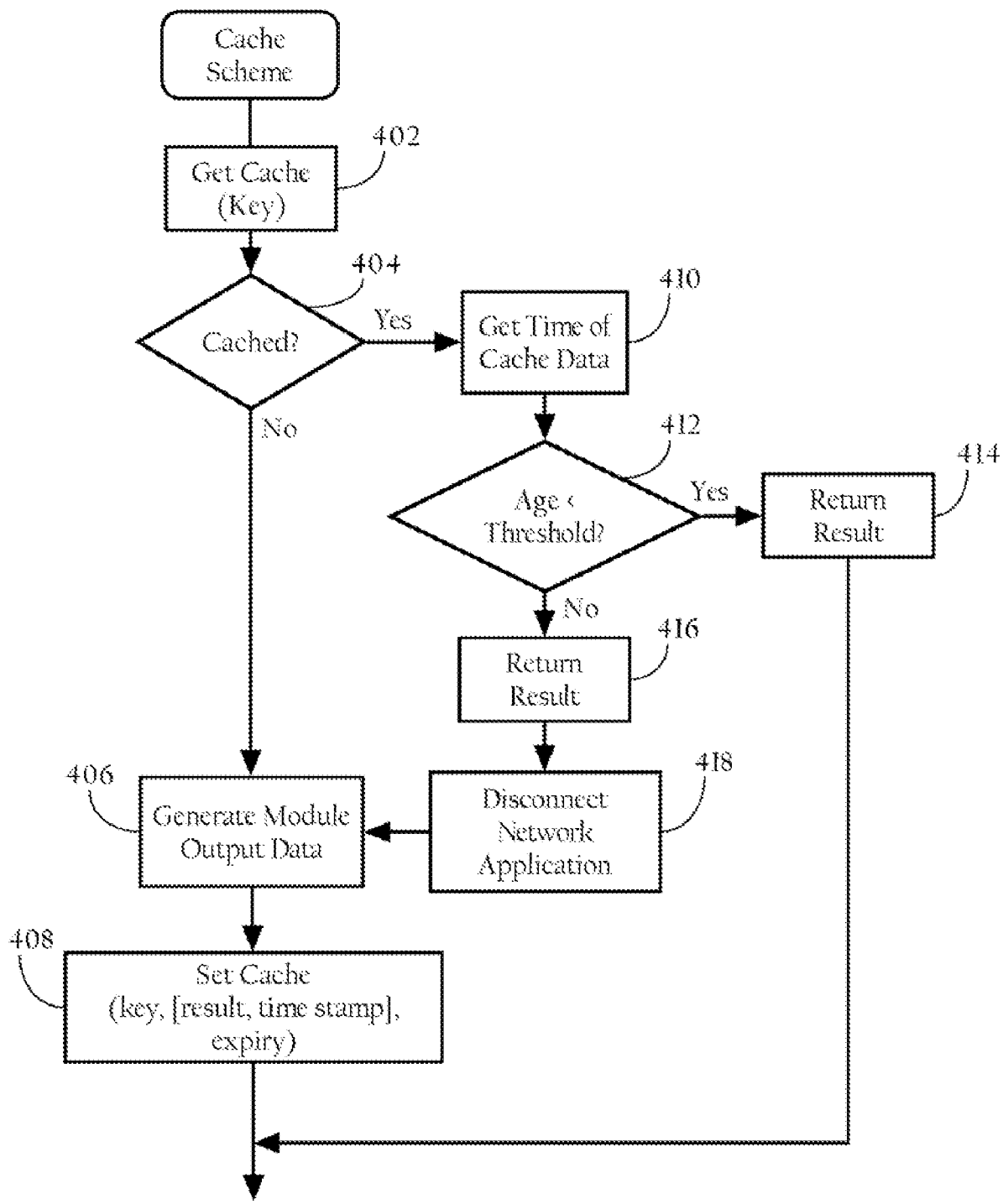
Fig._5

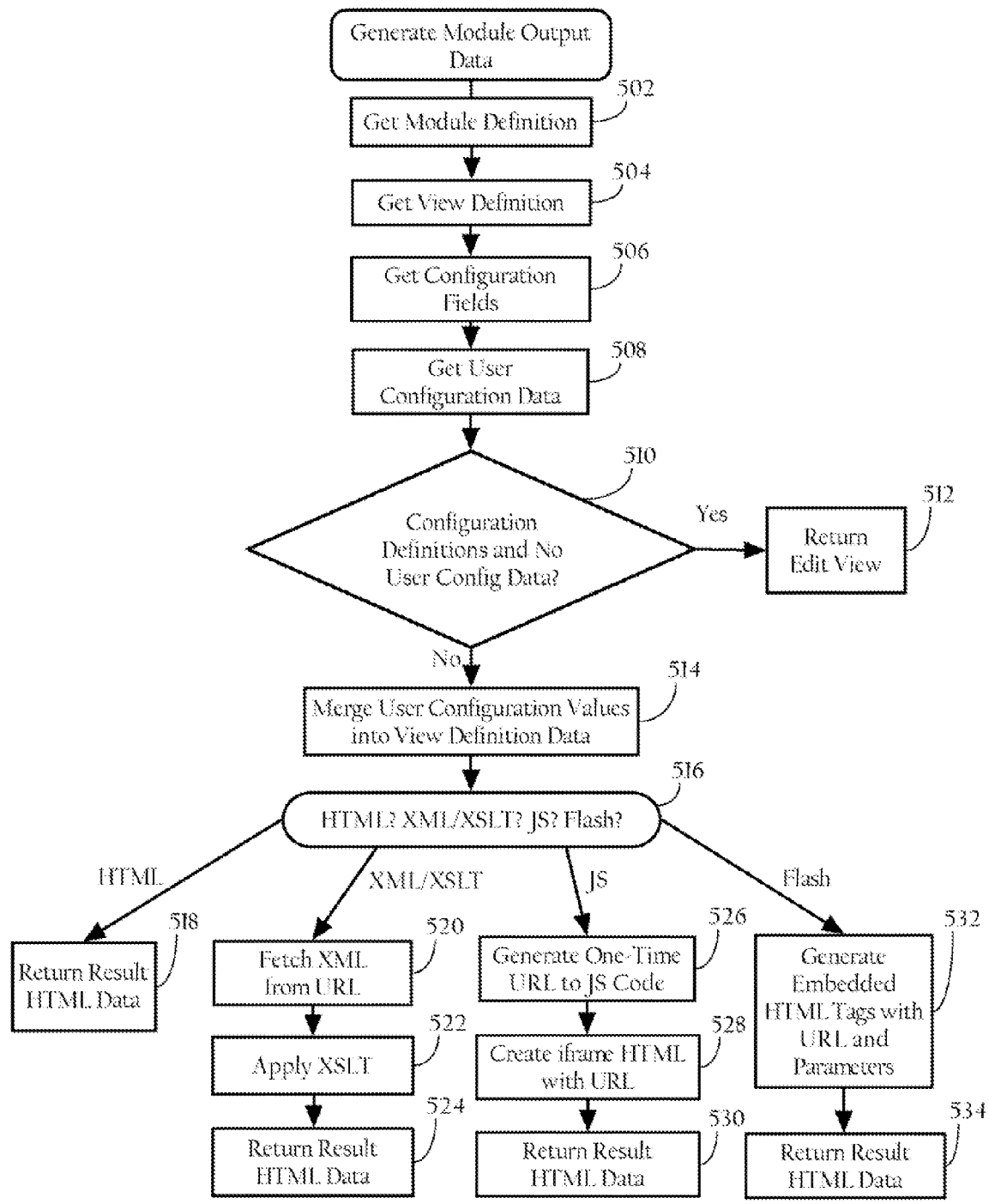
Fig._6

US 8,397,212 B2

MODULE HOSTING AND CONTENT GENERATION PLATFORM

TECHNICAL FIELD

The present disclosure generally relates to module hosting and content generation in interactive network sites.

BACKGROUND

Interactive systems connected by wide area networks such as the Internet have steadily evolved into vibrant mediums for information exchange, social interaction and sharing of digital media. Internet users typically maintain one or more accounts with various service providers that feature customizable personal pages, such as personal home pages (e.g., my.yahoo.com, etc.), personal pages on social network sites (e.g., facebook.com, myspace.com, etc.), and the like. To enhance the utility and customization of such pages to end users, service providers sometimes allow users to customize their pages with one or more functional modules or widgets (hereinafter referred to as modules).

In web or Internet environments, these modules can include hypertext markup language (HTML) code and scripts (such as JavaScript, and Asynchronous JavaScript and extensible markup language/extensible stylesheet language (AJAX)) that execute within the context of a client application, such as a browser, to achieve a variety of useful or entertaining functions. For example, modules can be developed to display content, such as blog entries, news headlines or podcasts, obtained from Really Simple Syndication (RSS) feeds. Other modules can be developed to display a slideshow of photos hosted on a content aggregation site, such as flickr.com. Other modules can display real-time stock quotes. In many instances, the modules appear in a base HTML document as frames or Inline Frames (iframes), which make it possible to embed another HTML document inside the base HTML document. The service providers maintaining these customizable pages may develop a number of modules from which users may select and add to their pages.

SUMMARY

The present invention provides a method, apparatus, and system directed to providing web pages and other documents to users that include one or more modules. In particular embodiments, the present invention utilizes modules to output information to be displayed on customizable pages of users, such as customizable home pages, personal pages on social network systems, and the like. Modules are functional components associated with a personal page, and display various module output data (e.g., personal profile, media player, content, RSS feeds, etc.) in module regions on the page. A module hosting platform provides module output data to a network application, which in turn merges the module output data into a base template and returns the page to the user. In addition, a given page may be configured to include more than one instance of a given module. Each instance of a given module may be based on different configuration information. As such, the network application may generate different information for each module instance.

DESCRIPTION OF THE DRAWINGS

FIG. 5 illustrates an example process flow associated with providing module output data to a network application.

FIG. 6 illustrates an example process flow associated with generating module output data.

DESCRIPTION OF EXAMPLE EMBODIMENTS

A. Example Network System Architecture

A.1. Example Network Environment

Figure 1:
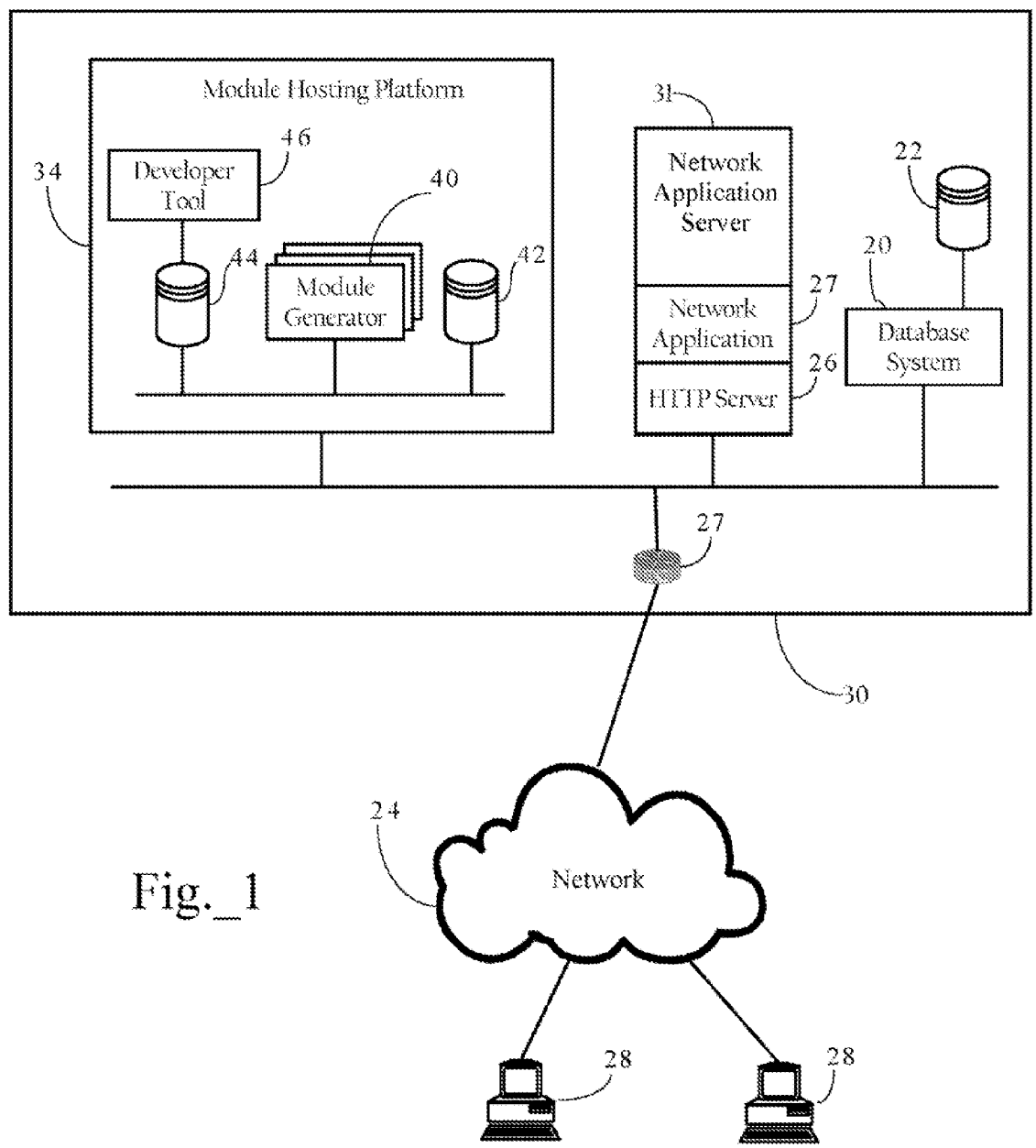
FIG. 1 illustrates an example network environment in which particular embodiments may operate.

FIG. 1 illustrates an example network environment in which particular embodiments may operate. As FIG. 1 illustrates, particular embodiments of the invention may operate in a network environment comprising service provider site 30 and one or more client systems 28. Service provider site 30 comprises one or more network application servers 31 (which hosts a HyperText Transfer Protocol (HTTP) server 26 and a network application 27), a database system 20 that is operatively coupled to a database 22, and a module hosting platform 34. In one embodiment, module hosting platform 34 includes one or more module generators 40, a user configuration data store 42, a module data store 44, and a developer tool 46. A router 27 operatively couples service provider site 30 to network cloud 24. Network cloud 24 generally represents one or more interconnected networks, over which the systems and hosts described herein can communicate. Network cloud 24 may include packet-based wide area networks (such as the Internet), private networks, wireless networks, satellite networks, cellular networks, paging networks, and the like.

Database system 20 is a network addressable system that hosts a database application and may operate in conjunction with a variety of network applications, such as a social network system, a customizable user home page (e.g., my.yahoo.com), etc. Database system 20 is accessible to one or more hosts, such as network application server 31, over a computer network. In one embodiment, database 22 may store various types of information such as user account information, user profile data, addresses, preferences, page layout information, and/or financial account information. Database 22 may also store content such as digital content data objects and other media assets. A content data object or a content object, in particular embodiments, is an individual item of digital information typically stored or embodied in a data file or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Structurally, database 22 connotes a large class of data storage and management systems. In particular embodiments, database 22 may be implemented by any suitable physical system including components, such as database servers, mass storage media, media library systems, and the like.

Module hosting platform 34 hosts modules developed internally by service provider site 30, as well as modules developed by third parties. Module hosting platform 34 includes, in one embodiment, multiple module generators 40 to increase the capacity of the service provider site 30 to serve high volumes of users. Data store 44 stores module definition data, such as computer program code, HTML code, scripts, Adobe® Flash® (swf) objects, and the like. User configuration data store 42 stores configuration information for various modules in association with user identifiers. Developer tool 46 provides interfaces allowing module developers to access module hosting platform 34 to upload and register modules, which other users can add to web pages, such as personal pages and home pages.

In a particular embodiment, network application 27 may access database system 20 to retrieve, add or modify data stored therein as required to provide a network application, such as a social network application or customizable home page, to one or more users. In response to a request for a home page from a given user, for example, network application server 27 may access database system 20 to retrieve page format and layout information from a corresponding user account. The layout information may identify, among other things, modules that the user has added to his or her page. Network application 27 may then access module hosting platform 34 in order to obtain or generate HTML code and other content for adding the modules identified in the layout information. Network application 27 may then merge the module output data into a base document or page template and transmit the merged page to the user. The module output data may be merged into the base template within inline frames, frames, sections (defined by div tags), or simply merged into the base document without such elements.

Client systems 28 are operably connected to the network environment via a network service provider or any other suitable means. Client systems 28 may include personal computers or mobile devices, such as laptop computers, personal digital assistants (PDAs), etc. Clients systems 28 may include one or more processors, a memory, a network interface, one or more input/output (I/O) devices and a system bus interconnecting these components. Client systems 28 may also include an operating system and a user agent, such as a browser client, operative to interact with service provider site 30. Browser clients may include Microsoft® Internet Explorer®, Mozilla Firefox®, Apple® Safari®, Netscape® Navigator®, and any other suitable user agent. In some embodiments of the invention, session state information and user identifying information (e.g., user identifier) is contained in so-called browser cookies that are appended to HTTP requests and responses.

A.2. Example Server System Architecture

The server host systems described herein (such as network application servers 31) may be implemented in a wide array of computing systems and architectures. The following describes example computing architectures for didactic, rather than limiting, purposes.

Figure 2:
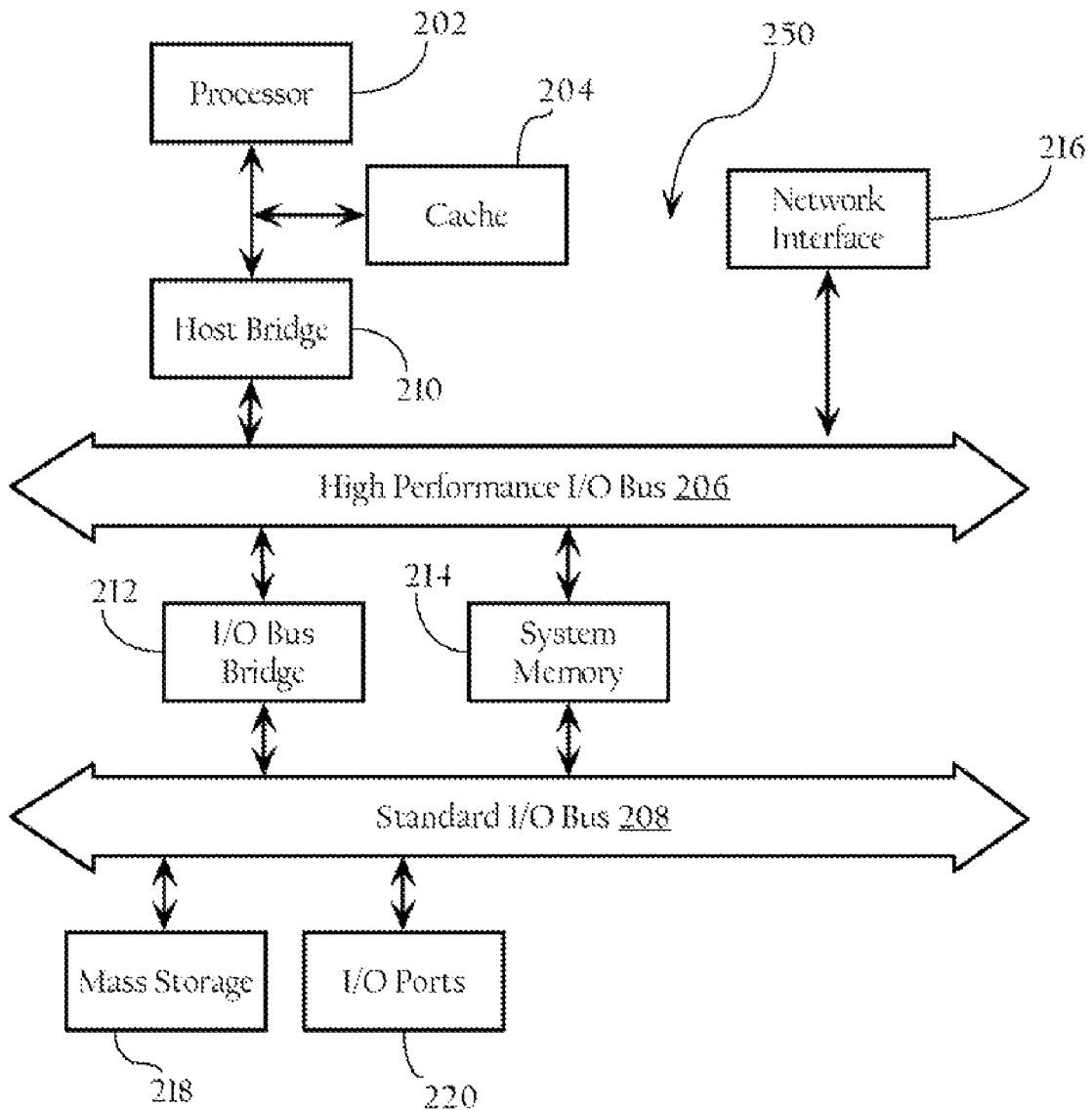
FIG. 2 illustrates an example computing system architecture, which may be used to implement a physical server.

FIG. 2 illustrates an example computing system architecture, which may be used to implement a physical server. In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218, and I/O ports 220 couple to bus 208. Hardware system 200 may optionally include a keyboard and pointing device, and a display device (not shown) coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the location server 22; whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist, with the components of hardware system 200 being coupled to the single bus. Furthermore, hardware system 200 may include additional components, such as additional processors, storage devices, or memories.

As discussed below, in one embodiment, the operations of one or more of the physical servers described herein are implemented as a series of software routines run by hardware system 200. These software routines comprise a plurality or series of instructions to be executed by a processor in a hardware system, such as processor 202. Initially, the series of instructions may be stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP/Vista operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like. Of course, other embodiments are possible. For example, the server functionalities described herein may be implemented by a plurality of server blades communicating over a backplane.

B. Example Page Including Modules

Figure 3:
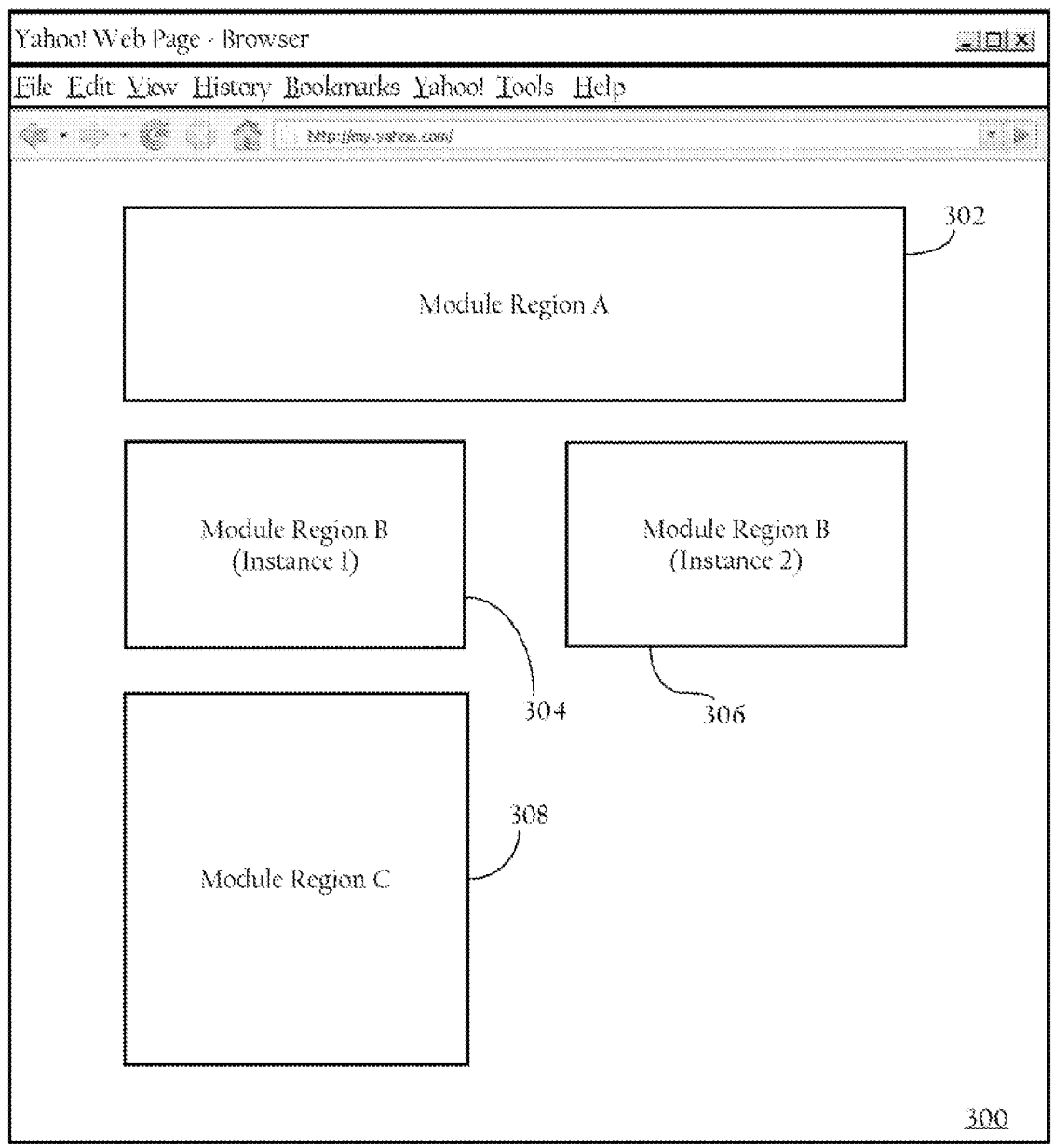
FIG. 3 illustrates an example personal page.

FIG. 3 illustrates an example page that includes a plurality of modules. As FIG. 3 illustrates, a personal page 300 includes a core information region 302 and one or more module regions 304, 306, and 308. The core information region 302 displays core information, which, in one embodiment, may include profile data such as user identification (ID, name, gender, age, a location, etc. Each module region 304-308 may display information unique and/or specific to the module type. For example, module regions 304 and 306 may display digital photographs or a slideshow of digital photographs uploaded by the page owner to a remote data store, such as a media aggregation or sharing site. Another module may display a calendar including events relevant to a set of keywords configured by the user. In particular embodiments, multiple instances of the same module may be invoked. For example, two different instances of the photo module, configured in two different manners, may be used to provide module output code for module regions 304 and 306. Another module region 308 may display a media player for playing a selected media file or media file play list including music, videos, etc.

In one embodiment, the module regions 302-308 display information based on the module definitions and configuration information corresponding to the respective modules. In particular embodiments, a module may include code sections (such as HTML code sections), code objects, applications, scripts, etc. that include computer-readable instructions operable to cause a processor to perform a set of actions. Using a media player module as an example, the media player module may output HTML code that causes a processor to load a music player and fetch music from a local or remote source. The media player module may provide user controls on a media player displayed in the media player module region (e.g., module region 308).

C. Providing Module Output Data for a Page

Figure 4:
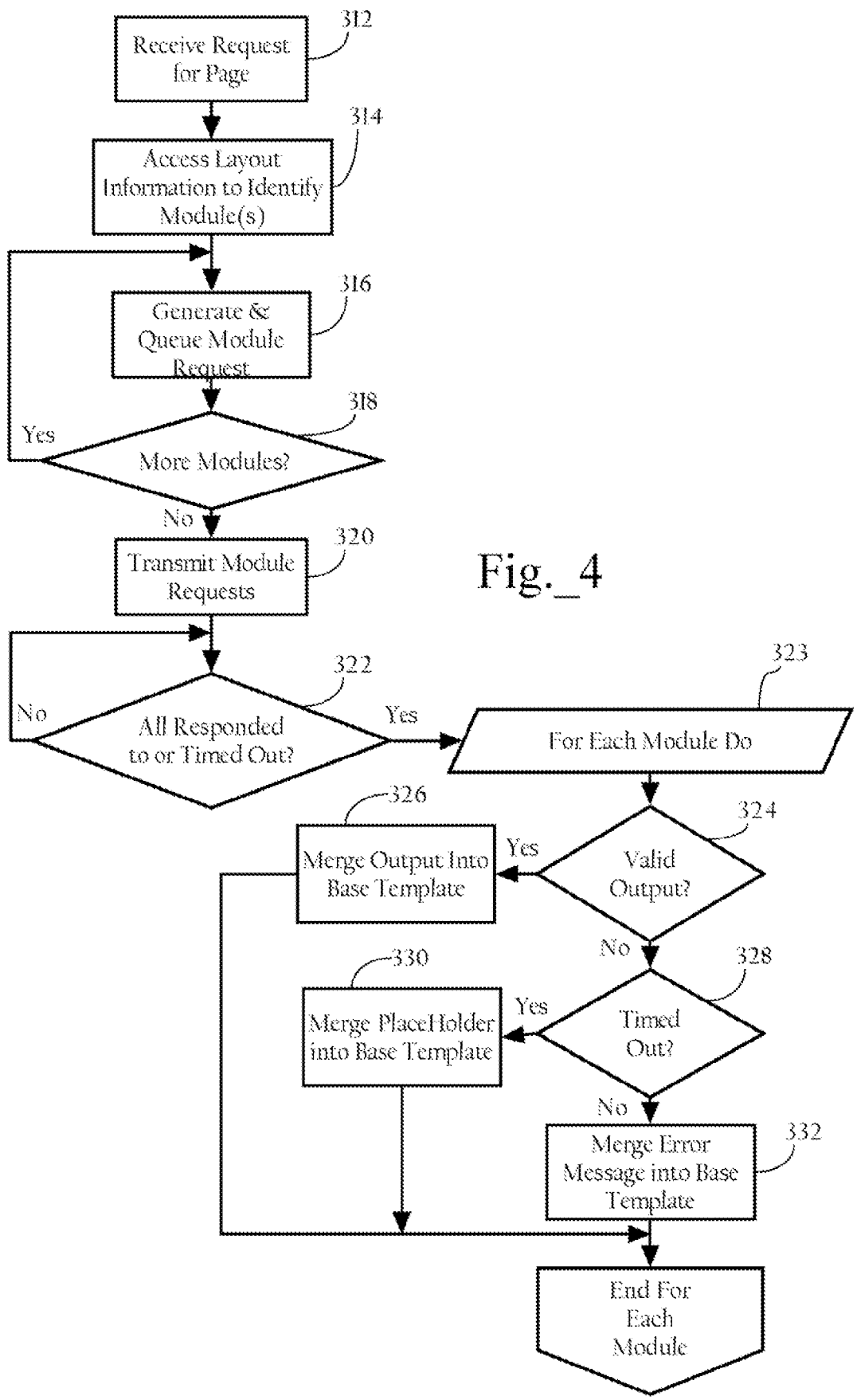
FIG. 4 illustrates an example process flow associated with retrieving page format and layout information.

FIG. 4 illustrates an example process flow associated with retrieving page format and layout information. As FIG. 4 shows, network application server 27 receives a request for a home page (for instance) from a given user (312). In one embodiment, the request may identify a user or owner of the page. For example, the request may be transmitted by a first user to access the personal page of a second user in a social network site. In another implementation, the request may be transmitted by the first user to view that first user's customized home page or the first user's personal page. In the former instance, the user identifier of the second user, which may be used to access layout information for the page, may be included in the HTTP request as an encoded parameter. Still further, in the former case, an identifier for the first user may be included in the module request as context parameter information. For example, the context parameter information may be a value pair, such as an attribute identifier (here, "viewing user") and viewing user identifier. In the latter case, the user identifier may be contained in a browser cookie or included in the HTTP request as an encoded parameter.

In response to the request, network application server 27 may access database system 20 to a retrieve a base template corresponding to the request, and page format and layout information from a corresponding user account (314). The layout information may identify, among other things, modules that the user has added to his or her page. In one embodiment, for each module instance identified in the layout information, network application 27 may then access module hosting platform 34 in order to obtain or generate HTML code and other content for adding the modules identified in the layout information. Network application 27 may then merge this content into a base document or page template and transmit the merged page to the user. In addition, network application 27 may also receive modification requests generated by Ajax scripts associated with a given module and executing within the context of a browser or other user agent of client system 28.

In one embodiment, network application 27, for each module instance identified in the layout information, generates a module request including a module identifier, an instance identifier, a user identifier and a view name and queues each module request until all requests are generated. After all the module requests are generated and queued (316, 318), network application 27 causes the module requests to be transmitted to the module generators 40 (320, 322) to retrieve module output data to use in responding to the request. In one implementation, a transmit process distributes the queued module requests to multiple module generators 40 to provide for generation of module output data in parallel in order to decrease response times. A variety of schemes can be used, such as round-robin arbitration or arbitration schemes based on observed load of the module generators 40. In another embodiment, network application 27 can transmit the module requests to a load balancer which forwards the module requests to the module generators 40.

As discussed in more detail below, module generator 40 may receive a module request identifying a module, a module instance and a user. In other implementations, the request may also include a view name. Module generator 40 may use these identifiers to retrieve module definition and user configuration data and generate module output data. In response to a given module request, module generator 40 fetches the requested output data from cache (if available) or generates the requested output data, and returns the output data to the network application 27. In one embodiment, the output data may include HTML code that causes the browser or other user agent to render information, load JavaScript, load media players, and/or Flash objects in the personal page. In the implementation shown, network application 27 waits for responses to all module requests or for the module requests to time out (322). As to each module, valid module output data may be returned, the module request may have timed out, or an error may have occurred. Network application responds to each of these circumstances as described below. The network application 27, for each module (323), incorporates or merges the module output data, if the output data is valid (324), into the base template of the page (326). In some implementations, the module output data is merged into the base template such that a browser client renders corresponding module regions 302-308 of a personal page. In these instances, the module output data can be inserted within frames, inline frames, HTML div tags, and the like. In some modules, however, the module output may result in HTML code or scripts that do not result in objects or module regions being rendered within a page or otherwise. For example, module output data for a given module can be configured to change the background color or theme of the page.

In one embodiment, if network application 27 requests module output data from module hosting platform 34, and the request times out (328), the network application 27 may insert placeholder code into the base template (330). The placeholder code may contain the module request information and may include scripts (such as an Ajax script object) that causes a browser client to reissue the module request after a predefined time period (e.g., 2 seconds). In one embodiment, if the module output data is not valid (324) and does not time out (328), the module generator 40 may output an error indication, and network application 27 may include HTML code that causes an error message to be displayed within the corresponding module region (332).

C.1. Database Schema

As described in more detail below, module generator 40 provides module output data based on information provided in module requests, module definition information stored in module data store 44, and module instance information stored in user configuration data store 42. For example, in one embodiment, a module request may include a module ID, instance ID, user ID, and view name. As described in more detail below in connection FIGS. 5 and 6, the module generator 40 accesses configuration information from the user configuration data store 42 and module definition information from module database 46 based on the module ID, instance ID, user ID, and view name. The following are example types of module definition and configuration information that the module generator 40 may utilize to generate module output data. In one embodiment, the configuration information described below may be implemented in one or more tables of a relational database, and accessed by a tuple of information attributes, such as module ID, instance ID, user ID, etc. In other embodiments, the configuration information may be stored in other database types, such as object-oriented databases, and the like.

C.1.a. Module Definition

Module data store 44 stores module definition information. In one embodiment, a module definition may include: basic module information, one or more configuration fields, and one or more view definitions.

C.1.a.i. Basic Module Information

In one embodiment, basic module information includes basic information that describes a given module. For example, basic module information may include: a module ID, author ID, module description, security level, status, data, etc. In one embodiment, the module ID is a unique identifier for a module such as a media player module. In one embodiment, the author ID may indicate a particular author of the module, such as an individual or corporate entity. In one embodiment, the module description may describe one or more attributes of the module (e.g., a media player module that plays video). In one embodiment, the security level may indicate security attributes (e.g., permissions), such as trusted, non-trusted and the like. Module hosting platform 34 may set the security level based on a variety of considerations, such as whether the module was created by an internal team, or a third party external to service provider site 30. In one embodiment, the status may indicate whether a particular module is in development, in beta, live, obsolete, etc. In one embodiment, the data may include serialized key value pairs that may for example other behaviors than how the data is to be rendered (e.g., control caching behavior, etc).

C.1.a.ii. Configuration Fields

Modules may also include one or more configuration parameters that require specification by the end user. In a particular implementation, module data store 44 includes a configuration fields table, where a given module may include one or more configuration field entries. In one embodiment, the configuration fields entries in the table may include the following: a module ID, configuration name, configuration label, configuration type, attributes (e.g., serialized key-value pairs), encoding filters, etc. The configuration name and label may identify a particular configuration parameter of a given module. In one embodiment, the configuration name is the name of the configuration, and the configuration is a label that is displayed to the user in an edit or configuration view or interface. Also, the configuration type may describe a particular type of configuration parameter. The attributes field described other characteristics of the configuration parameter, such as an encoding parameter, a default value, and a filter. Configuration parameters could include a URL of third party sites, such as an RSS feed or a photo aggregation site, third party account identifiers, access parameters, keywords, profile data, user preferences, settings and the like.

C.1.a.iii. View Definition

Module data store 44 may also include a view definition table or other data structure. In particular embodiments, the view definition defines how module output data is generated for a given view type. In one embodiment, a view definition may include: a module ID, a view name (e.g., big, small, narrow, wide, top, bottom, side, etc.), a view type, data, etc. A view name is an arbitrary name that generally corresponds to how module output is rendered on a given page. For example, various implementations of a module can be developed for different locations on the page. For example, a first version of a module can be adapted for display at the top of a page, while a second version of a module can be adapted for display on the side of a page in a narrow window. In one embodiment, the view name may be used to identify a view and ideal dimensions for the view (e.g., pixel width and height). For example, using the media player example, the view name may indicate dimensions that are large enough to show control buttons and a window to display a video. Given the foregoing, the view name may be determined by the network application 27 based on layout information indicating where the module is to be rendered in a given page. In one embodiment, the module ID is used as a key to identifying one or more view definitions associated with a given module.

A view type corresponds an implementation format for a given module directed to how the module is defined, and may affect how the module generator 40 generates the module output data for the module. For example, a module can be defined in whole or in part by scripting languages, container object definitions, markup language code, executable code objects, and combinations of the foregoing. An implementation format can correspond to one or more of the foregoing, or combinations thereof. The module view definition data may refer to or include HTML code, Javascript objects, JSON code, XML documents, hypertext preprocessor (PHP) code, Flash objects, and the like. For example, a given module can be implemented with two or more view definitions, where a first view definition implements the module as a Flash object, while a second view definition implements the module as a Javascript object.

In one embodiment, the module generator 40 supports the following view types, which may include hypertext markup language (HTML), JavaScript (JS), Flash (e.g., a URL), extensible markup language/extensible stylesheet language transformations (XML/XSLT) (e.g., a URL of XML feed and XSLT). Still further, the supported view types are extensible in that module generator 40 can be configured to support additional view types, such as PHP code, Java code, as well as compiled or interpreted code objects. HTML is a markup language for creating web pages and provides a means to describe the structure of text-base information in a given document. Javascript is a scripting language primarily used to write functions that are embedded into an HTML page and interact with the Document Object Model (DOM) of the page. Javascript Object Notation (JSON) structs can also be used in connection with view definitions. XML is a markup language that allows users to define their own tags and that facilitates the sharing of structured data across different information systems. XSLT can be used to convert XML code to HTML code. XML/XSLT can be used to access internal or external web services. For example, XSLT code can be used to convert XML output from a web service to HTML code.

Accordingly, the module generator 40 may perform different operations based on the determined view type. In one embodiment, a site administrator or other user may determine what view types are permissible. Still further, a module developer may define a plurality of view types for a given module. In one embodiment, the module generator 40, at run time, may determine what view types are to be used in response to any given request based on one or more policies. Such policies may be based on load (e.g., a high-load environment versus a low-load environment), browser type, or other factors (e.g., security, user preferences, etc.).

Still further, the network applications requesting module output data can request a specific view name and/or view type for a given module. The network applications may base these decisions on current load, where in the page the module is to be rendered, security policies, resulting volume of module output data, and the like.

C.1.b. User Configuration Data Store

The configuration data store 42 stores the actual configuration data for users relative to the modules. The configuration data, for a given module instance, maps to the configuration fields defined in the Configuration Fields table of the module data store 44 (see above). In a particular implementation, the user configuration data store is organized as a table having the following schema or table fields: module ID, instance ID, user ID, and data. The data field, in a particular implementation, is a series of serialized key-value pairs where the keys correspond to the configuration parameters required by the module, and the values correspond to the actual configuration data. For example, the key-value pairs for a module that retrieves photos from a photo sharing site may include 1) URL=www.photos.com; 2) userid=example user; and 3) keywords=flowers, city, apple, horses.

C.2. Generating Module Output Data

As discussed above, in one embodiment, a given module request may include a tuple of attributes including a module ID, instance ID, user ID, and a view name. The module request may also include context parameter information as well. As described above, context parameter information may be, for example, a value pair such as an attribute identifier and attribute value.

FIG. 5 illustrates an example process flow associated with providing module output data to a network application 27 in response to a module request. As FIG. 5 shows, module generator 40 accesses a cache to obtain a cached version, if any, of the module output data (402). The key used to lookup the module output data in the cache is generated by combining the module ID, instance ID, user ID and view name in the module request. If the module output data is not cached, the module generator 40 generates the module output data (406) (see FIG. 6, below). As FIG. 5 shows, the module generator 40 caches the module output data in association with the key (408). In one embodiment, the module generator 40 stores a key (including the module ID, instance ID, user ID, and view name), module output data, a time stamp, and expiry value in the cache (e.g., 5 days, 2 weeks, etc.). A background or clean up process may use the expiry value to flush old entries from the cache.

If the module output data is cached, the module generator 40 obtains the time stamp of the cached entry (410). If the age of the module output data is less than a threshold (412), the module generator 40 returns the module output data to the network application 27 (414). In particular embodiments, the threshold may be configurable (e.g., 15 minutes, 24 hours, etc.) based on the particular module ID or a default threshold for all modules. If the age of the module output data is greater than the threshold, the module generator 40 still returns the module output data (416). The module generator 40 then disconnects the network application 27 (418). In one embodiment, the module generator 40 may include a content length field in the HTTP response header equal to the number of bytes in the response, which causes network application server 27 to disconnect after it reads the number of bytes. The module generator 40 then generates module output data (406) and caches it (408). As such, the next time the network application server 31 reconnects and requests module output data, the module generator 40 will send a more recent version of the module output data.

FIG. 6 illustrates an example process flow associated with generating module output data. As FIG. 6 shows, the module generator 40 obtains a module definition (502) based on the module ID. For example, the module ID may correspond to a module for showing videos uploaded by a user to a video sharing site, such as YouTube.com®. The module generator 40 then obtains a view definition (504) based on the module ID and view name. For example, the view name may be "mosh_big" and may indicate dimensions for a larger viewing area, the view type may be XML/XSLT, and the data may include a call to a YouTube application programming interface (API) (e.g., http://youtube.com/videos/ryo). In one embodiment, portions of the view definition data may include may include variables that are substituted with user configuration data (e.g., http://youtube.com/videos/{$username}, where {$username} may represent "ryo" or any other user name returned from user configuration data store 42). As such, when the module generator 40 generates module output data, the module generator 40 replaces the variable {$username} with a value (e.g., the user name). Of course, view definition data may include additional variables that are also substituted.

The module generator 40 then obtains configuration fields (506) based on the module ID. The module generator 40 then obtains user configuration data from the user configuration data store 42 (508) based on the module ID, instance ID, and user ID. If the module has configuration definitions but module generator 40 obtains no or insufficient corresponding user configuration data (e.g., user configuration values missing or incomplete) (510), the module generator 40 returns an edit view (512). In one embodiment, the edit view may be HTML and/or Ajax code that defines a form that prompts the user to enter the user configuration values required for the module. The edit view may be generated based on the user configuration fields that the module generator 40 could not find, or may be a special view that is defined by the module developer.

If the module generator 40 returns both the configuration definitions and the user configuration values (510), the module generator 40 merges the user configuration data into the view definition data, replacing the variables in the view definition data with the user configuration values (514). In one embodiment, in addition to user configuration values, the module generator 40 may also merge contextual information (e.g., viewer ID, owner ID, group ID, text, etc.) into the view definition. For example, the output of a module may depend on the user accessing the page, which may be different from the owner of a page (such as in a social network site). Other context information can include time of access, browser type, and the like. The module generator 40 may perform different actions based on the determined view type (516). In particular embodiments, example view types may include HTML, XML/XSLT, JS, Flash. Other view types are possible including customized view types.

If the view type is HTML, the module generator 40 returns the HTML result data (i.e., module output data) to the network application 27 (518). If the view type is XML/XSLT the module generator 40 fetches XML from URL (520). The module generator 40 then applies XSLT (522) to convert the XML code to HTML code. The module generator 40 then returns HTML result data to the network application (524). If the view type is JS, the module generator 40 generates a one-time use URL to the JS code (526). The module generator 40 creates an iframe HTML with URL (528). The module generator 40 then returns the HTML result data to the network application (530). If the view type is Flash, the module generator 40 generates embedded HTML tags with a URL to the flash object and any other required parameters (532). The module generator 40 then returns the HTML result data to the network application (534). In one embodiment, the module generator 40 may optionally wrap the HTML result data in a wrapper before sending it to the network application 27. In one embodiment, the wrapper may include HTML code, a status, whether the module is trusted or not, whether the module output data cached, the age of the module output data, etc.

The present invention has been explained with reference to specific embodiments. For example, while embodiments of the present invention have been described as operating in connection with HTML and HTTP, the present invention can be used in connection with any suitable protocol environment. Other embodiments will be evident to those of ordinary skill in the art. It is therefore not intended that the present invention be limited, except as indicated by the appended claims.

What is claimed is:

1. A module hosting and generation platform comprising at least one computing device, comprising:
    a module data store operative to store module definition information comprising, for each module, a module identifier and one or more module view definitions, each module view definition is associated with a determined view type of a plurality of view types and defines how module output data is generated for said view type, each view type is indicative of one or more attributes of computer program code that implements a module view definition;
    a user configuration data store operative to store configuration information in association with a key comprising a module identifier, an instance identifier and a user identifier; and
    one or more module generators implemented via said at least one computing device, each operative to:
        receive, from a network application, one or more module requests for module output data, wherein each module request includes a module identifier, an instance identifier, and a user identifier;
        retrieve, responsive to the module requests, configuration information from the user configuration data store;
        retrieve a module view definition from the module data store;
        generate module output data by merging user configuration data with the retrieved module view definition and conditionally performing additional processing operations based on the view type associated with the module; and
        transmit the module output data to the network application.

2. The platform of claim 1 wherein the module data store is further operative to store view names in association with modules, and wherein the module requests each include a view name.

3. The platform of claim 1 wherein the module output data comprises hypertext markup language (HTML) code.

4. The platform of claim 1 wherein the one or more module generators are each operative to cache module output data in association with corresponding keys, each key comprising a module identifier, instance identifier, and user identifier.

5. The platform of claim 1 wherein the one or more module generators are each operative to retrieve a cached version of the module output data if available.

6. The platform of claim 1 wherein the plurality of view types comprise one or more of hypertext markup language (HTML), extensible markup language/extensible stylesheet language transformation (XML/XSLT), JavaScript (JS), and container format file objects.

7. The platform of claim 1 further comprising one or more network application hosts operative to receive a request for a web page from a user agent;
    access a data store of layout information to identify one or more modules to add to a base document;
    generate and transmit module requests for the one or more identified modules to one or more of the module generators;
    receive module output data responding to the module requests; and
    merge the module output data into the base document.

8. The platform of claim 1 wherein at least one module comprises two or more view definitions, each corresponding to a different view type.

9. The platform of claim 1 wherein at least one module request further comprises context information, and wherein the one or more module generators are operative to merge the context information with module view definitions during generation of module output data.

10. A method comprising:
    maintaining, via a computing device, a module data store operative to store module definition information comprising, for each module, a module identifier and one or more module view definitions, each module view definition is associated with a determined view type of a plurality of view types and defines how module output data is generated for said view type, each view type indicative of one or more attributes of computer program code that implements a module view definition;
    maintaining, via the computing device, a user configuration data store operative to store configuration information in association with a key comprising a module identifier, an instance identifier and a user identifier;
    receiving, from a network application at the computing device, one or more module requests for module output data, wherein each module request includes a module identifier, an instance identifier, and a user identifier;
    retrieving, responsive to the module requests via the computing device, configuration information from the user configuration data store;
    retrieving, via the computing device, a module view definition from the module data store;
    generating, via the computing device, module output data by merging user configuration data with the retrieved module view definition and conditionally performing additional processing operations based on the view type associated with the module; and
    transmitting, via the computing device, the module output data to the network application.

11. The method of claim 10 wherein the module data store is further operative to store view names in association with modules, and wherein the module requests each include a view name.

12. The method of claim 10 wherein the module output data comprises hypertext markup language (HTML) code.

13. The method of claim 10 further comprising caching module output data in association with corresponding keys, each key comprising a module identifier, instance identifier, and user identifier.

14. The method of claim 10 further comprising retrieving a cached version of the module output data if available.

15. The method of claim 10 wherein the plurality of view types comprise one or more of hypertext markup language (HTML), extensible markup language/extensible stylesheet language transformation (XML/XSLT), JavaScript (JS), and container format file objects.

16. The method of claim 10 further comprising receiving a request for a web page from a user agent;
   accessing a data store of layout information to identify one or more modules to add to a base document;
   generating and transmitting module requests for the one or more identified modules to one or more of the module generators;
   receiving module output data responding to the module requests; and
   merging the module output data into the base document.

17. A system comprising one or more network application servers, each operative to:
   receive a request for a web page from a user agent;
   access a data store of layout information to identify one or more modules to add to a base document;
   generate and transmit module requests for the one or more identified modules to one or more of module generators;
   receive module output data responding to the module requests; and merge the module output data into the base document;
   a module platform comprising: a module data store operative to store module definition information comprising, for each module, a module identifier and one or more module view definitions, each module view definitions is associated with a determined view type from a plurality of view types and defines how module output data is generated for said view type, wherein each view type corresponds to a module implementation format;
   a user configuration data store operative to store configuration information in association with a key comprising a module identifier, an instance identifier and a user identifier; and
   one or more module generators, each operative to:
      receive, from a network application, one or more module requests for module output data, wherein each module request includes a module identifier, an instance identifier, and a user identifier;
      retrieve, responsive to the module requests, configuration information from the user configuration data store;
      retrieve a module view definition from the module data store;
      generate module output data by merging user configuration data with the retrieved module view definition and conditionally performing additional processing operations based on the view type associated with the module; and
      transmit the module output data to the network application.

18. The system of claim 17 the one or more network application servers are each further operative to generate and queue the module requests, and transmit the module requests to the one or more module generators in a distributed manner.

19. The system of claim 17 wherein the module data store is further operative to store view names, and wherein the network application is operative to specify a view name in a request.

20. The system of claim 17 wherein the module platform is operative to cache module output data in association with corresponding keys, each key comprising a module identifier, instance identifier, and user identifier.

21. The system of claim 20 wherein the module platform is operative to retrieve a cached version of the module output data if available.

* * * * *